(12) United States Patent
Eagar

(10) Patent No.: US 6,809,503 B1
(45) Date of Patent: Oct. 26, 2004

(54) SYSTEMS AND METHODS FOR CONSERVING ENERGY IN A SWITCHING CIRCUIT

(75) Inventor: Dale R. Eagar, Colorado Springs, CO (US)

(73) Assignee: Linear Technology Corporation, Milpitas, CA (US)

( * ) Notice: Subject to any disclaimer, the term of this patent is extended or adjusted under 35 U.S.C. 154(b) by 68 days.

(21) Appl. No.: 10/342,415

(22) Filed: Jan. 13, 2003

(51) Int. Cl.[7] ............................. G05F 1/10; G05F 1/652
(52) U.S. Cl. ........................................ 323/222; 323/282
(58) Field of Search ................................ 323/222, 282, 323/284, 351, 265

(56) References Cited

U.S. PATENT DOCUMENTS

| | | | |
|---|---|---|---|
| 3,582,758 A | 6/1971 | Gunn | 363/127 |
| 3,652,874 A | 3/1972 | Patridge | 327/375 |
| 4,395,675 A | 7/1983 | Toumani | 323/271 |
| 4,578,630 A | 3/1986 | Grosch | 323/271 |
| 4,754,385 A | 6/1988 | McDade et al. | 363/16 |
| 4,931,716 A | 6/1990 | Jovanovic et al. | 323/285 |
| 5,097,196 A | 3/1992 | Schoneman | 323/222 |
| 5,365,118 A | 11/1994 | Wilcox | 330/51 |
| 5,408,150 A | 4/1995 | Wilcox | 327/108 |
| 5,457,379 A | 10/1995 | Jacobs et al. | 323/222 |
| 5,481,178 A | 1/1996 | Wilcox et al. | 323/287 |
| 5,912,552 A | 6/1999 | Tateishi | 323/285 |
| 6,051,961 A | 4/2000 | Jang et al. | 323/224 |
| 6,087,817 A | 7/2000 | Varga | 323/287 |
| 6,094,038 A | 7/2000 | Lethellier | 323/282 |
| 6,188,209 B1 | 2/2001 | Poon et al. | 323/255 |
| 6,249,156 B1 | 6/2001 | Attwood | 327/110 |
| 6,259,235 B1 | 7/2001 | Fraidlin et al. | 323/222 |
| 6,362,604 B1 * | 3/2002 | Cravey | 323/241 |
| 6,377,481 B1 * | 4/2002 | Mantov | 363/56.12 |
| 6,495,993 B2 | 12/2002 | Eagar | 323/271 |
| 6,504,351 B2 | 1/2003 | Eagar et al. | 323/282 |
| 6,512,352 B2 * | 1/2003 | Qian | 323/282 |
| 6,605,931 B2 * | 8/2003 | Brooks | 323/272 |
| 6,611,130 B2 * | 8/2003 | Chang | 323/235 |
| 6,677,736 B1 * | 1/2004 | Barnes et al. | 323/280 |
| 6,680,603 B1 * | 1/2004 | Klaus-Manfred | 323/266 |

* cited by examiner

*Primary Examiner*—Bao Q. Vu
(74) *Attorney, Agent, or Firm*—Fish & Neave; Mark D. Rowland; Chi-Hsin Chang

(57) ABSTRACT

A switch recovery circuit is disclosed for improving the efficiency of switching voltage regulators. The switch recovery circuit includes a first and second inductor, a capacitor, a first diode, and a recovery circuit. The capacitor and diode comprise an AC coupled loop circuit around the first inductor. Current flows through the loop circuit soon after the switch is opened and charges the capacitor. The recovery circuit, which includes a second inductor that is magnetically coupled to the first inductor, provides current, at least some of which discharges the capacitor (i.e. current that flows in the opposite direction to the loop current) after the loop current stops. A second diode is interposed in series with the second inductor to provide appropriate voltage offsets in the circuit and to prevent the first inductor from being shorted to ground through the second inductor.

23 Claims, 2 Drawing Sheets

SYSTEMS AND METHODS FOR CONSERVING ENERGY IN A SWITCHING CIRCUIT

BACKGROUND OF THE INVENTION

The field of this invention relates to conserving energy that is lost through the action of electrical switches (e.g., armature, semiconductor or any other suitable type of switches). More specifically, but without limiting the applicability of the present invention, this invention relates to improving the efficiency of switching voltage regulators. This invention also relates to controlling the voltage across a switch.

In many different electrical circuits, switching action results in various types of currents that would result in energy loss unless the energy in these currents is somehow conserved. One example is a synchronous switching voltage regulator, which includes two switching transistors that are switched ON and OFF out of phase with one another by a control circuit. The switching transistors include a main switching transistor and a synchronous switching transistor. When the synchronous switching transistor is turned OFF in each cycle, the channel current of the synchronous switching transistor moves into its body diode. A short time later, the main switching transistor turns ON, and a reverse recovery current flows through both switching transistors. The reverse recovery current increases rapidly to a large value, causing substantial power dissipation, because the body diode of the synchronous switching transistor has not yet commutated.

One approach to alleviating this problem involves controlling the rate of rise of the reverse recovery current, as disclosed in commonly-assigned U.S. Pat. No. 6,504,351 (hereinafter, "the '351 patent") to Eager et al., which is hereby incorporated by reference in its entirety. In the particular embodiments disclosed in the '351 patent, at least one inductor is placed in the commutation path of the body diode of a switching transistor. The inductor reduces the maximum reverse recovery current through the switching transistor, which reduces power dissipation.

The reverse recovery current flows through the inductor, which means the inductor stores energy. It is highly desirable to transfer this energy back to the input voltage source and/or other places where it may be used. In other words, it is highly desirable to conserve this energy. Possible methods and apparatus for restoring this energy to the input voltage source are described in the '351 patent and also in commonly-assigned U.S. Pat. No. 6,495,993 (hereinafter, "the '993 patent") to Eager, which is hereby incorporated by reference in its entirety. Although the energy transfer methods and apparatus described in the above patents are believed to be highly efficient, at least in some circumstances, it would be desirable to have another type of energy transfer system.

In addition to energy considerations, it is often necessary to control the voltage across a switch to ensure that the switch isn't damaged. The above patents describe an effective circuit configuration for ensuring that the absolute value of the voltage across a switch does not reach too high a level. In particular, embodiments are disclosed therein that show a loop comprising an inductor, a capacitor and a diode. The switch is coupled to the inductor such that the voltage across the switch is related to the voltage across the inductor. When this voltage reaches a sufficiently large value, the diode turns on, such that current flows through the loop. That is, current flows through the inductor, capacitor and diode, limiting the voltage drop across the inductor to the sum of the voltage drops across the capacitor and diode. Moreover, The voltage drop across the capacitor is controlled, which in effect controls the voltage across the switch.

Although the above patents disclose effective methods and apparatus for controlling the voltage across the capacitor, it would be desirable to provide an alternative to those methods and apparatus, at least in some circumstances.

SUMMARY OF THE INVENTION

The switch recovery circuit of the present invention answers the above needs. The switch recovery circuit of the present invention may be used in a circuit that includes a switch, an input energy source and current path circuitry. The current path circuitry may comprise, for example, a transistor, an inductor and an output capacitor that are part of a switching regulator circuit.

The switch recovery circuit of the present invention preferably includes a first inductor, a second inductor, a first capacitor, a first diode, and a recovery circuit. The recovery circuit transfers energy from the first inductor to the first capacitor and to the recovery circuit, and then back to the input energy source and/or to the current path circuitry.

As in the '351 patent and the '993 patent, the first capacitor and first diode comprise an AC coupled loop circuit around the first inductor. The first capacitor preferably has a relatively large capacitance value (e.g., 22 $\mu$F), so that the voltage across it remains relatively constant over time.

When the switch first opens, the current in the first inductor begins to decrease, causing the voltage across the first inductor to increase. In turn, this voltage increase causes the first diode to conduct and current flows in the loop comprising the first inductor, first capacitor and first diode. The switch is coupled to the input energy source (generally an AC ground) through the first capacitor and the diode so that the voltage across the switch is largely dictated by the voltage across the first capacitor when the diode conducts. Thus, the voltage across the switch may be kept at a relatively low value, which prevents the switch from being damaged.

The above mentioned loop current charges the first capacitor, which represents a transfer of energy from the first inductor to the first capacitor. The energy stored in the capacitor may increase during each switching cycle if the excess charge therein, caused by the loop current, is not returned to the input energy source and/or the current path circuitry. The recovery circuit assists in transferring this energy back into the input energy source and/or to the current path circuitry. The extent to which this energy return occurs during each cycle depends on circuit specific parameters.

The recovery circuit provides current that discharges the first capacitor (i.e. current that flows in the opposite direction to the loop current) after the loop current stops. The loop current stops because, as the current through the first inductor stabilizes, the absolute value of the voltage drop across the first inductor decreases, which in turn shuts off the current through the first diode.

The current flowing from the recovery circuit through the first capacitor may be returned to the input energy source and/or the voltage path circuitry. In either event, energy is transferred from the first capacitor.

The recovery circuit includes a second capacitor coupled at a node to the series combination of a third inductor and a second diode. The second diode is interposed between ground and the third inductor such that current may not flow through the third inductor to ground but only from ground through the third inductor. The third inductor and the first inductor are mutually inductive. Preferably, a voltage across the first inductor corresponds to a multiple of that voltage across the third inductor. In other words, the ratio of windings of the third inductor to the first inductor is preferably N:1, where N is greater than 1.

The action of the third inductor and second diode after the switch is closed depends on the voltage across the first capacitor. As previously mentioned, the voltage across the first capacitor gradually increases each switching cycle if the excess charge caused by the loop current is not returned. When the switch is open and the first diode is on, the voltage across the first inductor is almost equal to the voltage across the first capacitor. Thus, the larger the voltage across the first capacitor, the larger the voltage across the first inductor.

If the voltage across the first capacitor is sufficiently large, the negative voltage across the third inductor, which is equal to N times the negative voltage across the first inductor, will be sufficiently large to lower the voltage at the cathode of the second diode to turn on the second diode, such that current flows from ground through the third inductor. In this case, if the first diode is on, depending on the circumstances, current flows through the third inductor to charge the second capacitor or through the second inductor and the first diode.

If the first diode is off, depending on the circumstances, current flows through the third inductor to charge the second capacitor or through the first capacitor, thereby discharging the first capacitor. As previously described, the discharging of the first capacitor corresponds to a desirable return of energy to the input energy source and/or the current path circuitry.

In addition to returning energy from the first capacitor while the switch is open, the recovery circuit, in conjunction with the second inductor, acts to return energy from the first capacitor when the switch is closed. In this case, the voltage across the first inductor produces a voltage across the second inductor that pulls current across the second capacitor. This current flows through the first capacitor, thereby discharging the first capacitor. Discharging of the first capacitor results in a desirable return of energy from the first capacitor, as previously mentioned.

In addition to providing the energy return function mentioned above, the recovery circuit helps to provide current to the first inductor after the switch has opened but while the first diode is still on. This additional current helps to stabilize the voltage across the first inductor during this time.

BRIEF DESCRIPTION OF THE DRAWINGS

The above-mentioned objects and features of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
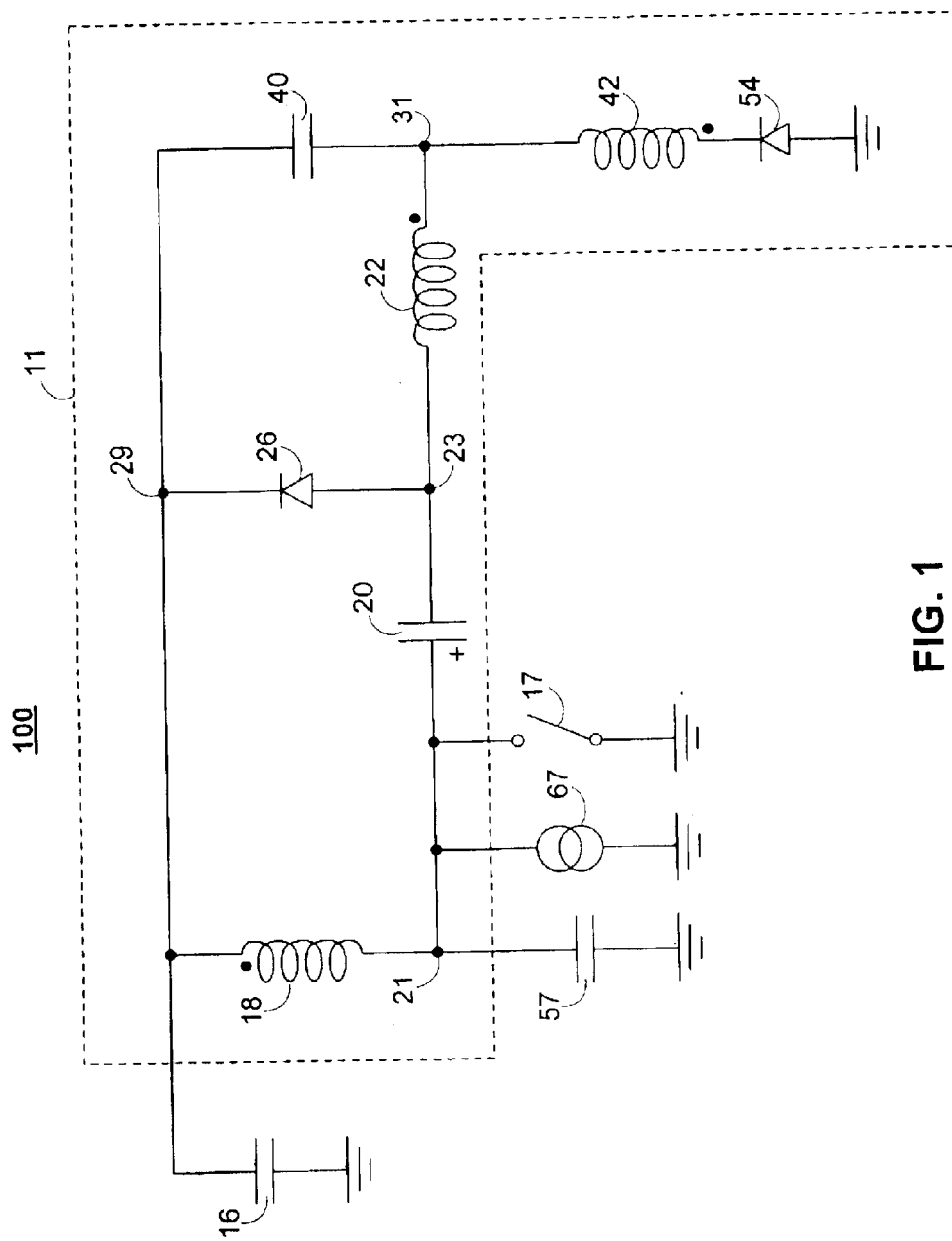
FIG. 1 is a schematic of a switch recovery circuit constructed in accordance with the principles of the present invention, shown as part of a circuit that includes a switch, an input capacitor, and current path circuitry.
Figure 2:
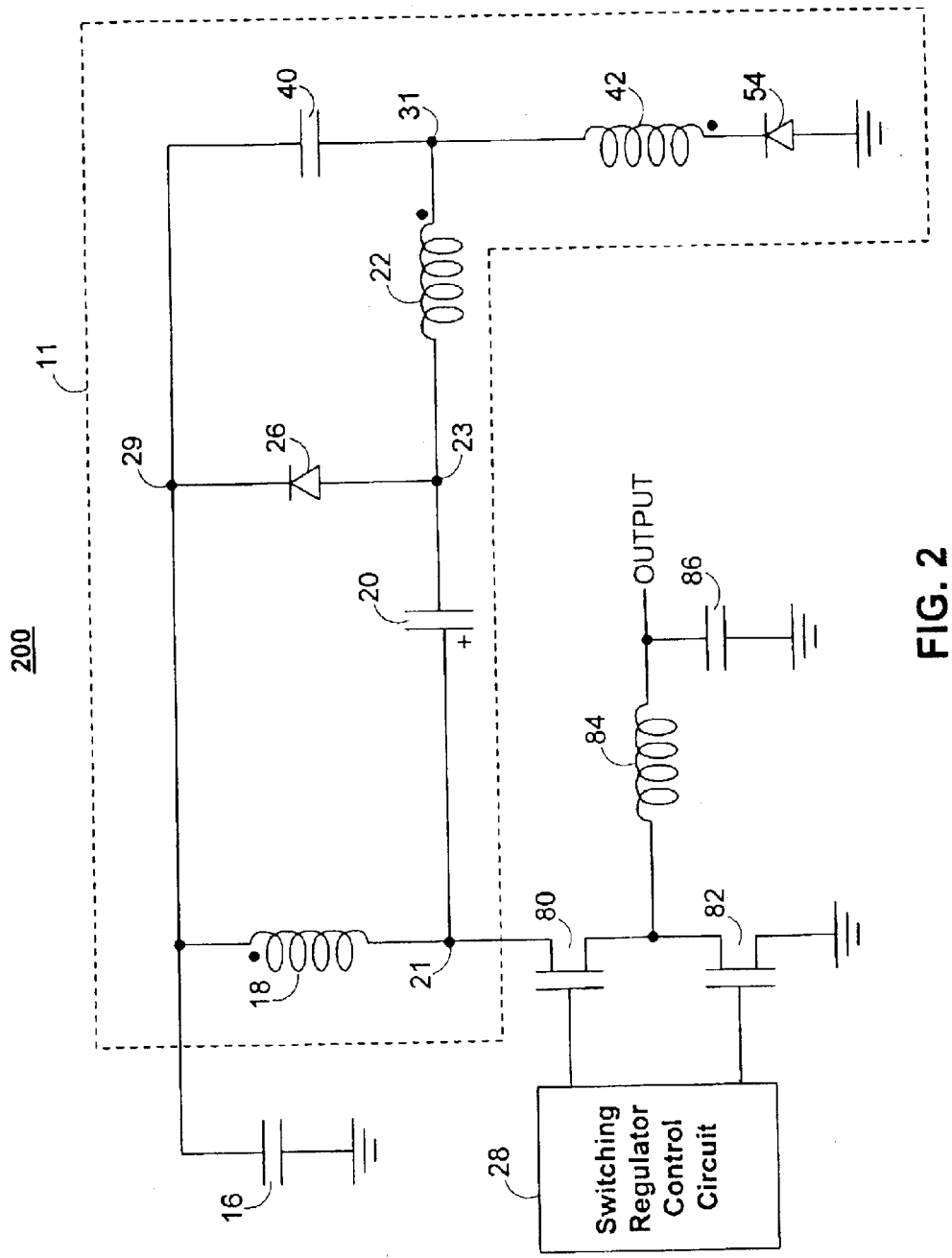
FIG. 2 is a schematic of a switch recovery circuit constructed in accordance with the principles of the present invention, shown as part of a voltage regulator circuit.

Switch recovery circuits are described below in accordance with the principles of the present invention. Two embodiments of the present invention, as shown in FIGS. 1 and 2 and described below, operate in a similar manner and are comprised of mainly identical components. Therefore, similar aspects will only be explained in great detail when dealing with the first figure.

Furthermore, as used in the specification and claims hereof, a first element may be coupled to a second element even though the elements are not linked at the same node. Moreover, current may flow from a first element to a second element even if there are intervening elements between the first and second elements, and not all of the current flowing through the first element must reach the second element.

FIG. 1 is a schematic diagram of an embodiment of an energy conservation circuit 100 constructed in accordance with the principles of the present invention. Circuit 100 includes a switch recovery circuit 11, shown as part of a circuit that includes a switch 17, an input capacitor 16, and a current source 67 of arbitrary magnitude and polarity. The input capacitor 16 represents an input energy source. It should be understood, however, that the present invention is not limited to circuits wherein the input energy source is a capacitor.

The combination of switch 17 and current source 67 in FIG. 1 models several different types of real world "switches." To the extent that a real world (non-ideal) switch conducts at least some current during the time it is open, in terms of the model shown in FIG. 1, that current flows through current source 67. Additionally, in FIG. 1, capacitor 57 at node 21 represents the effects of stray capacitance associated with the circuitry. Moreover, the circuit shown in FIG. 1 is simplified and partially idealized because, as will be appreciated by those of ordinary skill in the art, it does not show the numerous parasitic capacitances, inductances and resistances associated with real world circuit elements.

Switch recovery circuit 11, shown in FIG. 1, is designed to prevent the voltage level across switch 17 from reaching a level that could potentially damage switch 17. Furthermore, switch recovery circuit 11 also conserves energy associated with the switching operation of switch 17.

Switch recovery circuit 11 includes an inductor 18 coupled in series between switch 17 and input capacitor 16. A capacitor 20 is coupled to the inductor 18 and diode 26 such that inductor 18, capacitor 20 and diode 26 form a loop. An inductor 22 is also coupled to both diode 26 and capacitor 20 at a node 23. Moreover, a capacitor 40 is coupled in series to inductor 22 at a node 31 (however, capacitor 40 may preferably be omitted, depending on the circumstances, as will be further described below). Additionally, an inductor 42 is coupled to both capacitor 40 and the inductor 22 at node 31.

Inductors 18 and 22 may be two windings on the same core or they may be separate inductors. If inductors 18 and 22 are wound on the same core, the polarity of the voltages induced across inductors 18 and 22 are indicated by the dots shown in FIG. 1. The coupling factor between inductors 18 and 22 and 18 and 42 may be, for example, 80%–98%, however, other coupling factors may be used. Moreover, the turns ratio of the winding of inductor 18 and the winding of inductor 22 is generally unity.

Inductor 42 is magnetically coupled to inductor 22 whether or not inductor 22 is magnetically coupled to inductor 18. Specifically, the inductor 42 and inductor 22 comprise windings in the same magnetic circuit, with the ratio of windings between the inductor 42 and inductor 22 equal to N:1, where N is greater than 1. The optimal value of N will depend on circuit specific parameters. A ratio of 5:1 has been found to produce desirable results.

Capacitor 20 preferably has a relatively large capacitance value (e.g., 22 μF), so that the voltage across capacitor 20 (V20), which has the polarity shown in FIG. 1, changes by only a small amount over any given switching cycle (a switching cycle is the opening and closing of switch 17).

Capacitor 40, as mentioned above, may or may not be present in the circuit, depending on the design criteria. If the capacitor 40 is present, an associated capacitance of approximately 10 μF has been shown to produce favorable results. The return point of capacitor 40 is shown connected to node 29 but could be connected to ground or many other nodes.

Switch recovery circuit 11, comprising the elements described above, implements a set of functionalities. These functionalities include commutating the body diode intrinsic to a synchronous transistor (when switch recovery circuit 11 is part of a synchronous switching voltage regulator as shown in FIG. 2), clamping the peak voltage on node 21, transferring energy from inductor 18 to various storage sites, including capacitor 20, capacitor 40 and capacitor 16, and controlling the voltage across capacitor 20.

As stated above, commutation of the body diode of a synchronous transistor is one of the functionalities of switch recovery circuit 11. Because of the existence of current source 67, there will be a current flowing through inductor 18 during the time that switch 17 is open. When switch 17 is then closed, however, the magnitude of the current flowing through inductor 18 begins at the value flowing through current source 67 and then ramps up in accordance with the following equation: $V=L*(di/dt)$. Current flow and corresponding voltage polarities are positive in the directions indicated by the dots shown in FIG. 1.

Moreover, because of the relatively small inductance value of inductor 18 and the relatively high voltage across capacitor 16, the race of current rise in inductor 18 is quite rapid. The time that switch 17 in FIG. 1 opens is the moment of commutation of the body diode intrinsic to transistor 82 of FIG. 2.

The clamping action performed by switch recovery circuit 11 shown in FIG. 1 results in a transfer of energy stored in inductor 1B. This energy is transferred primarily to capacitor 20 and secondarily to various energy-storing components in the circuit shown in FIG. 1, and then ultimately back to input capacitor 16.

The clamping action occurs upon the opening of switch 17. When switch 17 opens, the portion of the current in inductor 18 that is in excess of the current of current source 67, having no path to flow in, commences to charge the stray capacitance modeled by capacitor 57. This causes a rapid rise in the voltage at node 21 as well as a small decrease in the current flowing through inductor 18.

This precipitous rise in the voltage of node 21 would, were it not for the clamping action innate to the design of the circuit shown in FIG. 1, damage switch 17. When the voltage at node 21 rises above the voltage at node 29 by an amount equal to V20+V26 (the voltage across diode 26), diode 26 begins conducting current, thus activating a clamp loop comprising capacitor 20 and diode 26 coupled around inductor 18.

At this time, the amount of current flowing through inductor 18 that is in excess of the amount of current flowing in current source 67 begins to flow through capacitor 20 and diode 26, and back to inductor 18. This current charges capacitor 20, implementing a transfer of energy from inductor 18 to capacitor 20.

The current flowing through inductor 18 will then begin to decrease until it becomes equal to the current of current source 67, at which time diode 26 commutates. At this point, the clamping action of the circuit shown in FIG. 1 is completed.

As described above, the transfer of energy from inductor 18 begins at the moment that switch 17 opens and continues throughout the clamping period until diode 26 commutates. Furthermore, in the above description of energy transfer, the excess energy of inductor 18 was transferred exclusively into capacitor 20. This is only the case when inductor 18 and inductor 22 are not coupled and capacitor 40, inductor 42 and diode 54 shown in FIG. 1 are omitted. However, with coupled inductors, the energy transfer becomes somewhat more complex.

When inductor 18 and inductor 22 are coupled and capacitor 40 is present, a part of the energy transferred out of inductor 18 is transferred into capacitor 20 directly, as described above.

The balance of the energy that is transferred out of inductor 18 is transformer coupled by the mutual inductance of inductor 18 and inductor 22 to charge capacitor 40.

There is an even more indirect transfer of energy involving inductor 42 that is coupled to inductor 22 with a turns ratio. The amount of energy transferred through this path, which is dependant on the amount of voltage across capacitor 40, charges capacitor 16.

The last of the switch recovery circuit 11 functionalities listed above involves the controlling of the voltage on capacitor 20. As excess energy is removed from inductor 18 during the clamping process, the majority of it is transferred into capacitor 20. In the absence of a mechanism for removal of the energy stored in capacitor 20 during each switching cycle, the voltage across it would gradually increase with each switching cycle and would eventually reach an unacceptably large value.

When switch 17 is open and diode 26 is on, the voltage across inductor 18 is almost equal to the voltage across capacitor 20. Therefore, the larger the voltage across capacitor 20 becomes, the larger the voltage across inductor 18 is.

If no path is available for the removal of energy from capacitor 20, the voltage across it and hence the voltage that node 21 reaches when switch 17 is opened will increase until switch 17 is damaged. This is a significant reason for the clamping action requirement.

To prevent switch 17 from being damaged, the voltage across capacitor 20 is regulated. The method of its regulation is as follows. If the voltage across capacitor 20 is sufficiently large (e.g., larger than the voltage programmed by the turns ratio N), the negative voltage across inductor 42, which is equal to N times the negative voltage across the inductor 18, will be sufficiently large to lower the voltage at the cathode of diode 54 in order to turn it on.

With diode 54 on, current will then flow through diode 54 and inductor 42, even though the induced voltage across inductor 42 suggests a di/dt through inductor 42 opposite the direction of current flowing from ground through the diode 54.

Current flows through diode 54 and inductor 42 to adjust the charge on capacitor 40 (if present) and on through inductor 22 and diode 26 (which is also on) into input capacitor 16.

When capacitor 40 is present and the voltage across it is of sufficient magnitude, the current through diode 54 will exceed that of inductor 22, with the difference in current discharging capacitor 40.

Because of the coupling between inductor 18 and inductor 22, whenever diode 26 is conducting, the current in inductor winding 22 will always flow in a direction and with a magnitude that will tend to equalize the magnitudes of the voltages across capacitors 20 and 40. This is due to the single-ended primary inductance converter (SEPIC) like action of the collection of parts comprising inductor 18, capacitor 20, diode 26, inductor winding 22, and capacitor 40.

At the end of the clamp time, the current through inductor 18 reduces to the magnitude of the current flowing in the current source 67 so that the current through diode 26 ceases. This point in time is referred to herein as the "Diode Commutation Event."

After the Diode Commutation Event, depending upon the voltage at node 21, either some current flows from holding capacitor 40 through inductor 22 and capacitor 20 into current source 67, or the current flows from holding capacitor 40 through inductor 22, capacitor 20, inductor 18 and into input capacitor 16.

In either case, capacitor 20 discharges, returning a portion of the energy stored in it to input capacitor 16 and/or current source 67.

The operation of the subcircuit described above, comprising capacitor 40, inductor 42 and diode 54, is explained in further detail below. The main function of this subcircuit (hereinafter referred to as "the recovery subcircuit") is to keep the voltage across capacitor 20 at a fixed, programmed value. In doing so, the recovery subcircuit returns the excess energy stored in capacitor 20 to input capacitor 16 and/or the current source 67. By either mode, the result is the discharging of capacitor 20 (i.e. removing its excess energy).

The ratio N+1:1 establishes the voltage at node 23 when both diodes 26 and 54 are on (the addition of 1 to N in the sum N+1 represents the winding of the inductor 22). If capacitor 40 is absent from switch recovery circuit 11, inductor winding 22 is more naturally considered one of the turns of inductor winding 42. Ignoring the voltage drop of the diodes 26 and 54, the voltage at node 23 is N+1 times the voltage across inductor 18, which, because diode 26 is conducting, is equal to the voltage across capacitor 20.

When capacitor 40 is absent and the voltage across capacitor 20 is in excess of the voltage set up by the turns ratio N, diode 54 continues conducting current after diode 26 has commutated. Conduction of diode 54 continues with an appropriate amount of current for the right duration of time in order to restore the voltage across capacitor 20 to its controlled voltage.

Accordingly, when switch 17 is open, the actions of inductors 22 and 42 and the capacitor 40 result in the existence of current that removes the excess energy from capacitor 20.

The operation of the recovery subcircuit when switch 17 is closed is also of significance. In addition to removing excess energy from capacitor 20 when switch 17 is open, the recovery subcircuit acts to remove such energy even when switch 17 is closed.

Moreover, in the case where inductor 18 and inductor 22 are coupled, and switch 17 is closed, a voltage develops across inductor 18, which in turn induces a voltage across inductor 22. This induced voltage moves charge from capacitor 20, placing it into capacitor 40. This charge movement is brought about by the induced voltage across inductor winding 22, and is performed by a current flowing through switch 17. This, in turn, results in a transfer of energy from the capacitor 20 to capacitor 40.

In the case where inductor 18 and inductor 22 are not coupled, there is an additional AC current flowing through capacitor 20 that represents the magnetizing current of inductor 22. This current would have the effect of causing too much charge to be extracted from capacitor 20 while switch 17 is closed, and extra charge put into capacitor 20 while the clamping action is occurring. Therefore, the recovery subcircuit acts to remove the excess energy from capacitor 20 both while switch 17 is open and while it is closed.

The behavior of inductor 42 and diode 54 after switch 17 is closed is as follows. When switch 17 is closed, the input voltage at node 29 is placed across inductor 18, which acts as the primary of a transformer.

Inductor winding 42 will, in response to the voltage imposed on inductor 18, produce a voltage that is N times the voltage across inductor 18. This voltage is imposed in a direction in a manner that causes diode 54 to block the flow of current.

Furthermore, the function of diode 54 may now be better appreciated in light of the above discussion of the operation of the recovery circuit. In the embodiment shown in FIG. 1, diode 54 is oriented to conduct current from ground through inductor 42. This orientation of the diode prevents current flowing from capacitor 20 through inductor 42.

As described above for FIG. 1, switch 17 represents many different types of switching circuits. Switch 17 may include, without limitation, a portion of a switching regulator circuit.

FIG. 2 is a schematic diagram of an embodiment of an energy conservation circuit 200 constructed in accordance with the principles of the present invention. As shown in FIG. 2, switch recovery circuit 11 is coupled to a switching voltage regulator. Many of the components comprising the energy conservation circuit 200 of FIG. 2 are also found in energy conservation circuit 100 as shown in FIG. 1, with identical reference numbers, and function as described above.

The voltage regulator circuit of FIG. 2 also includes transistors 80 and 82, an inductor 84, an output capacitor 86 and a control circuit 88 that closes the transistor switches 80 and 82 out of phase with one another. Moreover, transistors 80 and 82, inductor 84, capacitor 86 and control circuit 88 correspond to switch 17 and current source 67 of FIG. 1. In addition, the stray capacitance associated with node 21 shown as item 57 in FIG. 1 corresponds generally to the stray capacitance of FIG. 2 currently found in transistor 80, the output capacitance of transistor 82, the self capacitance of inductor 84, and all trace capacitances associated therewith.

The switch recovery circuit 11 of FIG. 2 implements the same set of functionalities as in FIG. 1. As in FIG. 1, switch recovery circuit 11 of FIG. 2 is responsible for the following: commutating the body diode that is intrinsic to transistor 82, clamping the peak voltage on node 21, transferring energy from inductor 18 to various storage sites including capacitors 20, 40 and 16, and controlling the voltage across capacitor 20.

These and other objects of the present invention are achieved with the circuit in FIG. 2 in the same manner and with the same components as found in FIG. 1. Energy is delivered to the output capacitor 86 of the switching power supply detailed in FIG. 2 in essentially the same manner that energy flows into current source 67 from capacitor 20 in FIG. 1.

Persons skilled in the art will further recognize that the circuitry of the present invention may be implemented using circuit configurations other than those shown and discussed above. For example, capacitor 20 may be eliminated from the circuits of FIGS. 1 and 2. As another example, diodes 26 and 54 of FIGS. 1 and 2 may each be replaced with a switching device such as a transistor. All such modifications are within the scope of the present invention, which is limited only by the claims which follow.

What is claimed is:

1. A switch recovery circuit for use in conjunction with a switch and an input energy source, comprising:
    a first inductor coupled between the switch and the input energy source;
    a second inductor magnetically coupled to said first inductor;
    a first capacitor with first and second terminals coupled between said first and second inductors such that said first terminal is associated with said first inductor and said second terminal is associated with said second inductor;
    a first switching device coupled to said second inductor such that said switching device is capable of preventing current from flowing through said second inductor in at least one direction; wherein
    the polarity of the magnetic coupling between said first inductor and said second inductor is such that changes in voltage across said first inductor with respect to said first terminal of said capacitor correspond to the same polarity changes in voltage across said second inductor with respect to said second terminal of the capacitor; and
    said first inductor is coupled to said first capacitor such that current flows from said first inductor to said first capacitor at least at some point in time while said switch is open.

2. The switch recovery circuit of claim 1 wherein said first and second inductors are wound to the same magnetic core.

3. The switch recovery circuit of claim 2 wherein the ratio of windings of said second inductor to said first inductor is N:1, where N is greater than 1.

4. The switch recovery circuit of claim 1 wherein said first switching device comprises a diode coupled to prevent current from flowing from said first capacitor through said second inductor.

5. The switch recovery circuit of claim 1 further comprising a second switching device coupled between said first inductor and said first capacitor such that current may flow through said first inductor, first capacitor and said second switching device.

6. The switch recovery circuit of claim 1 further comprising:
    a second capacitor coupled to said second inductor at a first node; and
    a third inductor coupled to both said second capacitor and said second inductor at said first node.

7. The switch recovery circuit of claim 6 wherein said third inductor is magnetically coupled to said first and second inductors such that changes in voltage across said first inductor with respect to said first terminal of said capacitor correspond to the same polarity changes in voltage across said third inductor.

8. The switch recovery circuit of claim 1 further comprising a current source coupled to said switch and said first inductor.

9. A switch recovery circuit for use in conjunction with a switch and an input energy source, comprising:
    a first inductor coupled between said switch and said input energy source;
    a second inductor magnetically coupled to said first inductor;
    a first capacitor with first and second terminals coupled between said first and second inductors such that said first terminal is associated with said first inductor and said second terminal is associated with said second inductor; wherein
    the polarity of the magnetic coupling between said first inductor and said second inductor is such that changes in voltage across said first inductor with respect to said first terminal of said capacitor correspond to the same polarity changes in voltage across said second inductor with respect to said second terminal of said capacitor;
    the magnetic coupling between said first and second inductors is such that the voltage across said first inductor corresponds to a greater voltage across said second inductor;
    said first inductor is coupled to said first capacitor such that current flows from said first inductor to said first capacitor at least at some point in time while said switch is open.

10. The switch recovery circuit of claim 9 further comprising a first switching device coupled to said second inductor such that said first switching device prevents current from flowing from said first capacitor through said second inductor at least at some point in time while said switch is open.

11. The switch recovery circuit of claim 10 wherein said first switching device comprises a diode.

12. The switch recovery circuit of claim 9 wherein said first and second inductors are wound to the same magnetic core.

13. The switch recovery circuit of claim 9 further comprising a first switching device coupled between said first inductor and said first capacitor such that current may flow through said first inductor, first capacitor and said second switching device.

14. The switch recovery circuit of claim 9 further comprising:
    a second capacitor coupled to said second inductor at a first node; and
    a third inductor coupled to both said second capacitor and said second inductor at said first node.

15. The switch recovery circuit of claim 6 wherein said third inductor is magnetically coupled to said first and second inductors such that changes in voltage across said first inductor with respect to said first terminal of said capacitor correspond to the same polarity changes in voltage across said third inductor.

16. The switch recovery circuit of claim 9 further comprising a current source coupled to said switch and said first inductor.

17. A switch recovery circuit for use in conjunction with a switch and an input energy source, comprising:
    a first inductor coupled between said switch and said input energy source;
    a second inductor magnetically coupled to said first inductor;
    a first capacitor coupled to said second inductor such that current flowing from said second inductor to said first capacitor charges said first capacitor; and
    a third inductor coupled to the parallel combination of said first capacitor and said second inductor, said third inductor also coupled to said first inductor;
    a first switching device coupled to said second inductor such that said first switching device is capable of preventing current from flowing from said first capacitor through said second inductor; wherein said first inductor is coupled to said third inductor such that current flows from said third inductor to said first inductor at least at some point in time while said switch is open.

18. The switch recovery circuit of claim 17 further comprising a current source coupled to said switch and said first inductor.

19. A switching regulator circuit having an input node, an output node, and a ground node, said circuit comprising:

a first transistor;

a second transistor;

a first inductor, wherein said first transistor, said second transistor, and said first inductor are coupled between said input node and said ground node;

a control circuit for switching said first and second transistors out of phase with each other;

a second inductor magnetically coupled to said first inductor;

a first capacitor with first and second terminals coupled between said first and second inductors such that said first terminal is associated with said first inductor and said second terminal is associated with said second inductor;

a first switching device coupled to said second inductor; wherein the polarity of the magnetic coupling between said first inductor and said second inductor is such that changes in voltage across said first inductor with respect to said first terminal of said capacitor correspond to the same polarity changes in voltage across said second inductor with respect to said second terminal of said capacitor;

said first inductor is coupled to said first capacitor such that current flows from said first inductor to said first capacitor at least at some point in time while said second transistor does not conduct current; and said first switching device is capable of preventing current from flowing through said second inductor in at least one direction.

20. The switch recovery circuit of claim 19 wherein said magnetic coupling between said first and second inductors is such that the voltage across said first inductor corresponds to a greater voltage across said second inductor.

21. A method for returning energy stored in a capacitor as a result of the switching action of a switch, said method comprising the steps:

(a) passing current through a first inductor through said switch;

(b) preventing at least a portion of current flowing from said inductor to flow through said switch, thereby reducing the current through said first inductor, thereby reducing a voltage across said first inductor;

(c) after step (b), providing current from said first inductor to said capacitor so as to decrease the reduction in current caused by performing step (b), thereby increasing the voltage across said capacitor;

(d) responsive to the voltage across said first inductor reaching a threshold value, providing current through said capacitor so as to decrease the voltage across said capacitor.

22. The method of claim 21 wherein step (d) is performed at least in part by a second inductor magnetically coupled to said first inductor.

23. The method of claim 22 wherein a voltage across said first inductor corresponds to a greater voltage across said second inductor.

* * * * *

UNITED STATES PATENT AND TRADEMARK OFFICE
CERTIFICATE OF CORRECTION

PATENT NO. : 6,809,503 B1
DATED : October 26, 2004
INVENTOR(S) : Dale R. Eagar

It is certified that error appears in the above-identified patent and that said Letters Patent is hereby corrected as shown below:

<u>Title page,</u>
Item [56], References Cited, U.S. PATENT DOCUMENTS, in "6,087,817", change "323/287" to -- 323/282 --.

<u>Column 2,</u>
Line 2, change "The" to -- the --.

<u>Column 5,</u>
Line 40, change "1B" to -- 18 --.

Signed and Sealed this

Twenty-fifth Day of April, 2006

JON W. DUDAS
*Director of the United States Patent and Trademark Office*